United States Patent
Smith et al.

(10) Patent No.: US 12,111,707 B2
(45) Date of Patent: Oct. 8, 2024

(54) SYSTEM AND METHOD FOR POWER MANAGEMENT OF DEVICES CONNECTED TO DATA PROCESSING SYSTEMS

(71) Applicant: Dell Products L.P., Round Rock, TX (US)

(72) Inventors: William Andrew Smith, Round Rock, TX (US); Timothy M. Lambert, Austin, TX (US); Jeffrey Leighton Kennedy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 125 days.

(21) Appl. No.: 18/159,929

(22) Filed: Jan. 26, 2023

(65) Prior Publication Data

US 2024/0256020 A1 Aug. 1, 2024

(51) Int. Cl.
*G06F 1/26* (2006.01)
*G06F 1/3215* (2019.01)
*G06F 13/42* (2006.01)

(52) U.S. Cl.
CPC .............. *G06F 1/26* (2013.01); *G06F 1/3215* (2013.01); *G06F 13/4221* (2013.01); *G06F 13/4295* (2013.01); *G06F 2213/0026* (2013.01); *G06F 2213/0042* (2013.01)

(58) Field of Classification Search
CPC .... G06F 1/26; G06F 13/4221; G06F 13/4295; G06F 2213/0026; G06F 1/3215; G06F 2213/0042
See application file for complete search history.

(56) References Cited

U.S. PATENT DOCUMENTS

| | | | |
|---|---|---|---|
| 7,308,705 B2 | 12/2007 | Gordy et al. | |
| 7,970,279 B2 | 6/2011 | Dress | |
| 9,331,899 B2 | 5/2016 | Christopher et al. | |
| 9,684,575 B2 | 6/2017 | Breakstone et al. | |
| 10,019,388 B2 | 7/2018 | Long et al. | |
| 10,261,561 B2 | 4/2019 | Chuang et al. | |
| 10,733,116 B2 * | 8/2020 | Litichever | G06F 13/4282 |
| 11,029,742 B2 | 6/2021 | Webel et al. | |
| 11,112,846 B2 | 9/2021 | Strach et al. | |
| 2008/0126629 A1 | 5/2008 | Huang | |
| 2009/0300329 A1 | 12/2009 | Naffziger et al. | |

(Continued)

OTHER PUBLICATIONS

"DC-MHS R1 Overview," 2022 OCP Global Summit (56 Pages).

(Continued)

*Primary Examiner* — Terrell S Johnson
(74) *Attorney, Agent, or Firm* — Womble Bond Dickinson (US) LLP (57) ABSTRACT

Methods and systems for managing operation of data processing systems are disclosed. The data processing systems may include a limited number of hardware components. To increase the usable number or types of hardware components, an add-in card or other device may be attached to the data processing system. When connected to the data processing system, these devices may consume power delivered by the data processing system. The devices may cooperate with the host data processing system so that power is consumed in a manner that is less likely to negatively impact operation of the devices and host system.

20 Claims, 8 Drawing Sheets

(56) References Cited

U.S. PATENT DOCUMENTS

| | | | |
|---|---|---|---|
| 2012/0005512 A1* | 1/2012 | Chew | G06F 1/3215 |
| | | | 713/300 |
| 2017/0147052 A1 | 5/2017 | Waters et al. | |
| 2020/0142462 A1* | 5/2020 | Durham | G06F 1/26 |
| 2020/0278733 A1* | 9/2020 | Li | G06F 1/28 |
| 2022/0130432 A1 | 4/2022 | Jayapal et al. | |

OTHER PUBLICATIONS

Kennedy, Jeff et al., "Peripheral Sideband Tunneling Interface (M-PESTI)," Datacenter—Modular Hardware Systems (DC-MHS) Rev 1.0, Apr. 27, 2022 (50 Pages).

"Why won't the computer wake up when connected over USB," Belkin Official Support, Web Page <https://www.belkin.com/support-article/?articleNum=8130>, accessed on Oct. 17, 2022 (2 Pages).

"Clock Gating for Power Reduction," CoQube Analytics and Services, 2021, Web Page <https://coqube.com/clock-gating-for-power-reduction/>, accessed on Oct. 17, 2022 (12 Pages).

Kennedy, Patrick, "Liquid Cooling Next-Gen Servers Getting Hands-on with 3 Options," ServeTheHome, Aug. 2, 2021, Web Page <https://www.servethehome.com/liquid-cooling-next-gen-servers-getting-hands-on-3-options-supermicro/4/>, accessed on Oct. 17, 2022 (10 Pages).

* cited by examiner

SYSTEM AND METHOD FOR POWER MANAGEMENT OF DEVICES CONNECTED TO DATA PROCESSING SYSTEMS

FIELD

Embodiments disclosed herein relate generally to operation management. More particularly, embodiments disclosed herein relate to systems and methods to manage conditions impacting power delivery in data processing systems.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services. To provide computer implemented services, a data processing system may include any number of hardware components. Due to the finite number of hardware components, the data processing system may have certain limits with its ability to provide the computer implemented services.

To provide flexibility, various add-in cards or other devices (e.g., "removable devices") may be selectively operably connected to the data processing systems. These devices may expand the type and quantity of hardware components usable to provide the computer implemented services. Consequently, more or different types of computer implemented services may be provided.

To operate, the removable devices may consume power from the host data processing system. However, consuming power may negatively impact the removable devices or host data processing system if not done in a manner expected by both devices.

To improve the likelihood that power is consumed in a manner expected by both device, the removable devices may initially limit their power consumption until contact with the host data processing system is made. Once connected, the removable device may receive information from the host regarding how to consume power in a manner that is less likely to negatively impact operation of the host data processing system or removable device. Consequently, the disclosed data processing system may have improved compatibility with removable devices that may having varying power consumption expectations.

In an embodiment, a method for managing operation of a data processing system is provided. The method may include identifying an occurrence of an attachment of a device to a connector of the data processing system; in response to the occurrence: gating off primary power of the data processing system that is received via the connector; while the primary power is gated off, performing a discovery process for presence of a point-to-point communication link through the connector; in a first instance of the discovery process where the point-to-point communication link through the connector is present: continuing to gate off the primary power until an instruction is received via the point-to-point communication link; initiating use of the primary power by the device in response to receiving the instruction; initiating power management for the primary power while in use; and providing computer implemented services, in part, using the device while the primary power is in use by the device.

Performing the discovery process may include advertising, to the data processing system, a type of the device.

The type of the device is advertised via an assertion and de-assertion using a sideband pin of the connector, and the type of the device indicates whether the device will gate of the primary power until instructed to utilize the primary power.

The method of claim 3 may also include, in a second instance of the discovery process where the point-to-point communication link through the connector is not present: initiating use of the primary power by the device without waiting for the instruction; initiating power management for the primary power while in use; and providing computer implemented services, in part, using the device while the primary power is in use by the device.

Initiating the use of the primary power by the device in response to receiving the instruction may include performing a power management action to maintain a voltage level of the primary power as the use of the primary power is initiated by the device.

Initiating the power management may include monitoring the voltage level of the primary power from the data processing system.

The instruction may be generated by a management controller of the data processing system tasked with managing the voltage level of the primary power.

Primary power may be gated off from hardware components of the device, the hardware components being used, in part, to provide the computer implemented services.

While the primary power is gated off, low power is consumed by a controller of the device to perform the discovery process. The Low power may be provided by the data processing system, or generated by the device using a voltage regulator and the primary power from the data processing system.

In an embodiment, a non-transitory media is provided. The non-transitory media may include instructions that when executed by a processor cause the method to be performed.

In an embodiment, a data processing system is provided. The data processing system may include the non-transitory media, and a hardware device, and may perform the method when the computer instructions are executed by the hardware device.

Figure 1:
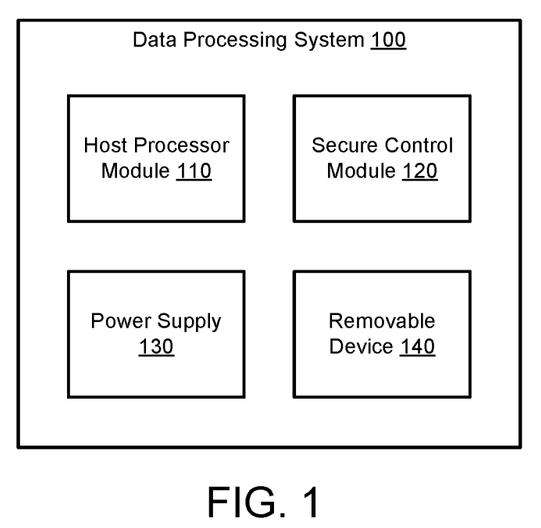
FIG. 1 shows a block diagram illustrating a system in accordance with an embodiment.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include any number of data processing system 100. Data processing system 100 may provide the computer implemented services to users of data processing system 100 and/or to other devices (not shown).

To provide the computer implemented services, data processing system 100 may include various hardware components (e.g., processors, memory modules, storage devices, etc.) and host various software components (e.g., operating systems, application, startup managers such as basic input-output systems, etc.). These hardware and software components may provide the computer implemented services via their operation.

For example, data processing system 100 may include a host processor module 110 which may include a processor, memory modules, and/or other components. These hardware components may provide processing functionality. Data processing system 100 may include any number and types of hardware components.

The ability of data processing system 100 to provide computer implemented services may be limited by the types and quantity of hardware components available to it. For example, the quantities and types of processors of data processing system 100 may limit how quickly information may be processed by data processing system 100, the number and types of memory modules of data processing system 100 may limit how much information may be temporarily stored for use in processing by data processing system 100, etc.

In general, embodiments disclosed herein may provide methods, systems, and/or devices for providing computer implemented services. To provide the computer implemented services, data processing system 100 may include functionality to reversibly add various hardware components to itself. By doing so, the rate at which the computer implemented services may be provided, the types of computer implemented services may be provided, and/or other aspects regarding the capability of data processing system 100 to provide computer implemented services may be provided.

When doing so, data processing system 100 may provide power to these components. For example, any of the hardware components may attach to data processing system via a connector. When connected data processing system 100 may expose power sources to the attached devices.

To consume power from the power sources, the hardware components may expect that the power sources will operate in predetermined manners. For example, the hardware components may presume that voltage and current levels are maintained within certain ranges, certain levels of resistance be presented to the hardware components, and/or the hardware components may make other types of presumptions regarding the power. If these presumptions are not accurate, then data processing system 100 or the connected hardware components may be impaired.

For example, the hardware components may not properly complete various power-on operations that prepare the hardware components for nominal operation. Likewise, hardware components of data processing system 100 may be impacted if the hardware components do not operate in a manner as expected by the data processing system.

To reduce the likelihood of data processing system 100 being negatively impacted during attachment and startups of hardware components attached to it, data processing system may perform processes for managing the process of initiating distribution of power to various hardware components (e.g., such as removable device 140). Likewise, the hardware components may cooperate with data processing system 100 to operate in a manner as expected by data processing system 100 during startups of the hardware components.

To provide the above noted functionality, data processing system 100 may include host processor module 110, secure control module 120, power supply 130, and removable device 160. Each of these components is discussed below.

Host processor module 110 may provide data processing functionality. The data processing functionality may be used to provide computer implemented services. Host processor module 110 may be implemented as a modularized array of components such as processors and memory modules (e.g., positioned on a circuit card). The modularized array may also include connectors to which various hardware components such as removable device 140 may be connected. When so connected, removable device 140 may operably connected to the processors, memory modules, and other components of host processor module. Consequently, host processor module 110 may utilize the hardware components of removable device 140 to provide computer implemented services.

Like host processor module 110, secure control module 120 may be implemented using a modularized array of hardware components (e.g., a circuit card with connectors to facilitate interconnection of the circuit card to other modules, and hardware components positioned on the circuit card). In contrast to host processor module 110 which may provide data processing functionality, secure control module 120 may provide management functionality. For example, secure control module 120 may include functionality to (i) identify changes in available hardware components (e.g., such as attachment/detachment of removable devices 140, discussed above) available for use by host processor module 110, (ii) identify types of devices attached to host processor module 110, and (iii) based on the types of the devices, manage the process of initiating power consumption by the devices connected to host processor module 110 in a manner that is less likely to negatively impact data processing system.

To provide the above noted functionality, secure control module may include a management controller. The management controller may be implemented using an in-band or out-of-band management controller. Management controller 124 may be implemented using a system on a chip, or other types of hardware components.

Power supply 130 may provide power to the components of data processing system 100. To do so, power supply 130 may distribute power (at varying voltage/current levels) to the components of data processing system 100. Power supply 130 may distribute power directly to the components or indirectly through other components.

For example, power supply 130 may deliver power to host processor module 110 which may in turn deliver power to devices connected to it, such as removable device 140.

Removable device 140 may include one or more hardware components which may be utilized by host processor module 110 to provide computer implemented services. Removable device 140 may implemented using, for example, hardware components positioned on a circuit board, and one or more connectors which may be connected to a corresponding connector of host processor module 110. The connector may allow power to be received from data processing system 100 and information to be exchanged with other components of data processing system 100.

To exchange information, removable device 140 may implement a point-to-point communication scheme such the Modular Peripheral Sideband Tunnelling Interface (M-PESTI) specification. When attached to host processor module 110, removable device 140 may serve as a target for M-PESTI communications. Host processor module 110 may include a logic device (e.g., a field programmable gate array) or other type of device that facilitates M-PESTI communications with attached devices.

To manage the process of powering up using power from data processing system 100, removable device 140 may gate off primary power (e.g., 12 Volts) provided by data processing system 100 upon initial connection, but may utilize lower voltage level power (e.g., auxiliary power such as 3.3 Volt) to power on controllers for M-PESTI communications.

Removable device 140 may then perform assertions/de-assertions to initiate discovery between the logic device of host processor module 110 and removable device 140. As part of the discovery process, removable device 140 may send specific information to the logic device so that the type of the device may be identified by the data processing system. Once discovered and able to communicate, removable device 140 may wait to receive instructions from the management controller of secure control module 120 regarding how to consume primary power from data processing system. The instructions may be customized by the management controller based on the type of removable device 140. Once received, removable device 140 may initiate consumption of primary power from data processing system 100 in accordance with the instructions.

Figure 3:
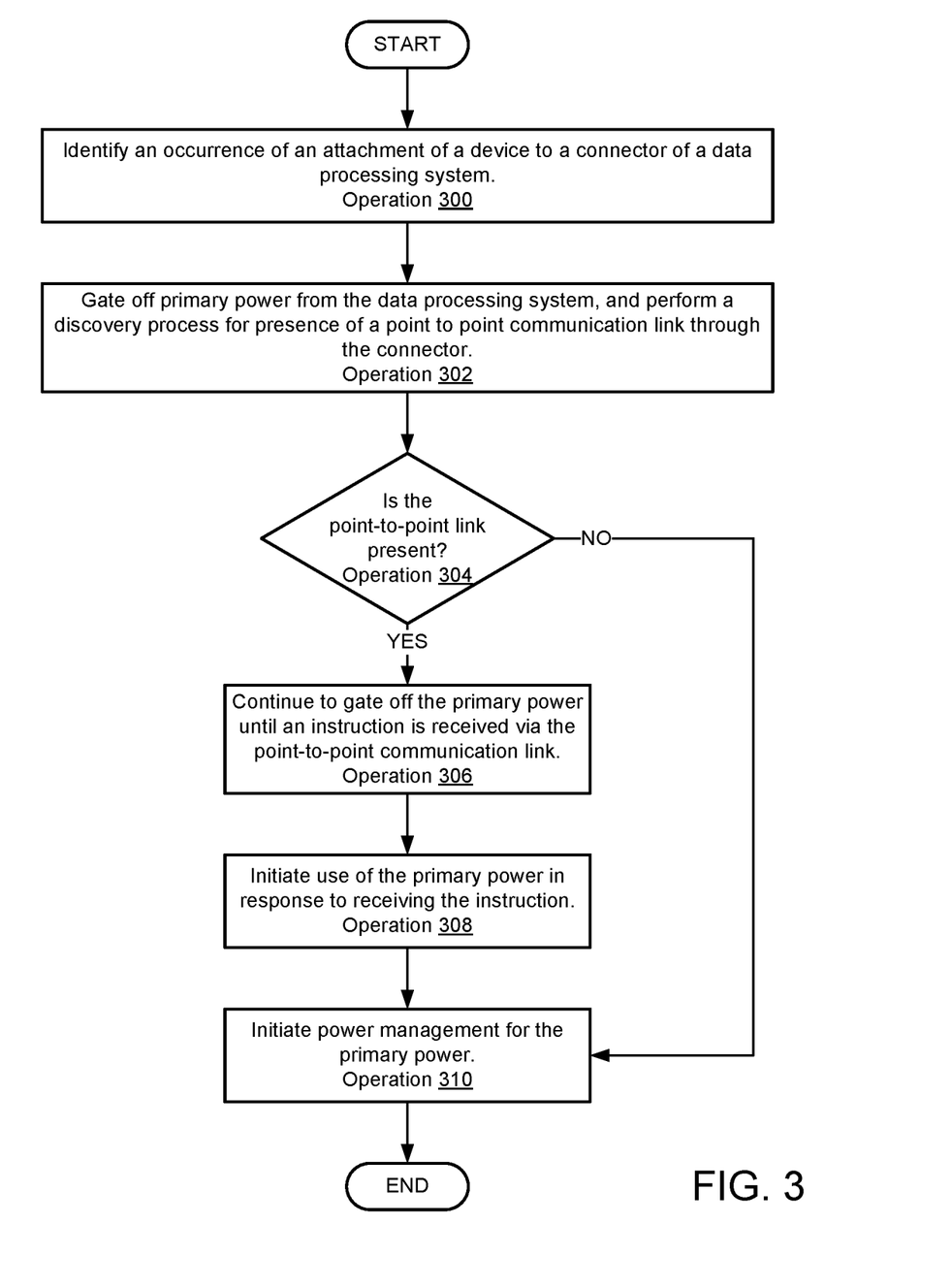
FIG. 3 shows a flow diagram illustrating a method of managing the operation of data processing systems in accordance with an embodiment.

When providing its functionality, data processing system 100, or components thereof, may perform all, or a portion, of the method illustrated in FIG. 3.

Data processing system 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated in FIG. 1 as including a limited number of specific components, a system in accordance with an embodiment may include fewer, additional, and/or different components than those illustrated therein.

As discussed above, data processing system 100 may provide power to removable device 140. FIGS. 2A-2E show connectivity topology diagrams illustrating connectivity between various components of data processing system 100 while power begins to be delivered to removable device 140.

Figure 2A:
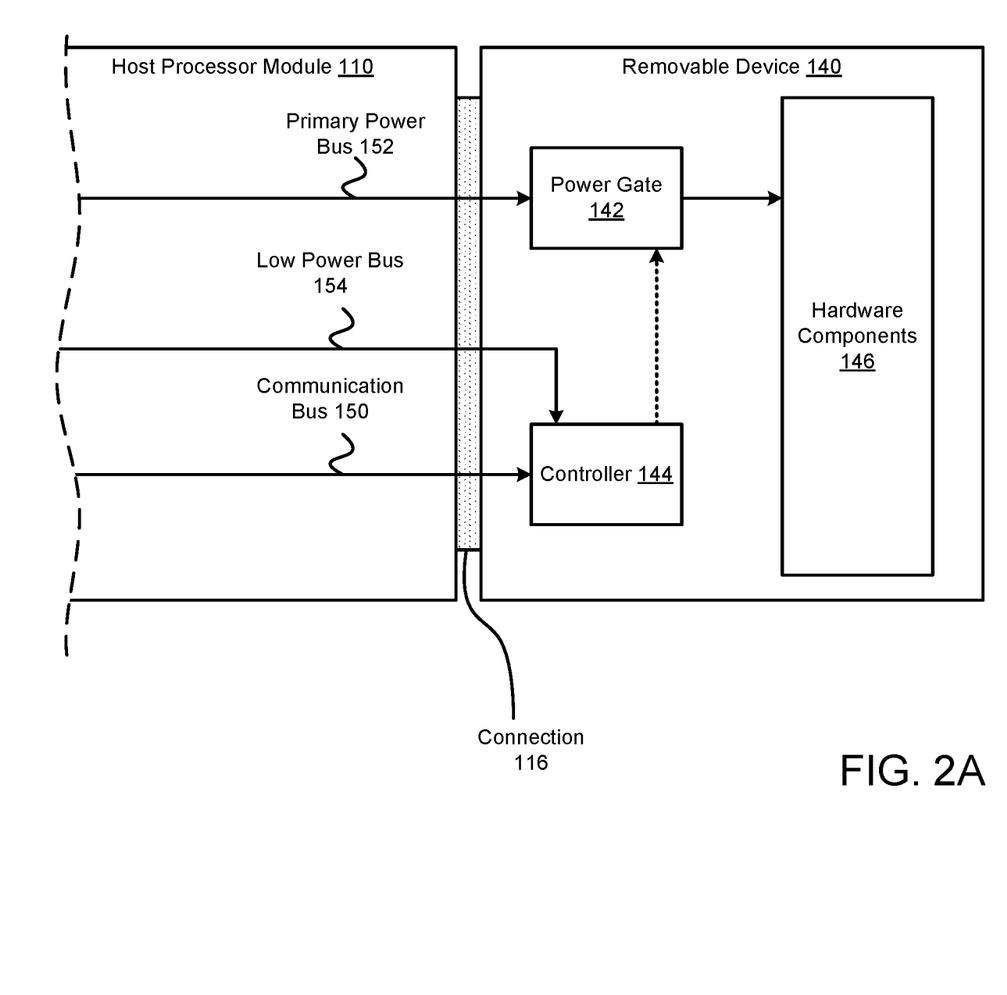
FIGS. 2A-2E show diagrams illustrating connectivity topologies in accordance with an embodiment.

Turning to FIG. 2A, a first connectivity diagram in accordance with an embodiment is shown. In this diagram, removable device 140 is operably connected to host processor module 110 via connection 116. Connection 116 may be established through physical connection of two connectors of host processor module 110 and removable device 140. The connectors may include a first number of conductors for power transmission and a second number of conductors for sideband communications.

To provide power to removable device 140, primary power bus 152 and low power bus 154 of host processor module 110 may be connected to removable device 140 via connection 116. Primary power bus 152 and low power bus 154 may be power distribution systems supplied with power by a power supply. Primary power bus 152 may supply power at a higher voltage level than low power bus 154.

Primary power bus 152 may connect to power gate 142, and low power bus 154 may connect to controller 144. Power gate 142 may gate power from primary power bus 152. For example, power gate 142 may be implemented with a transistor, electromechanical switch, or other active element that may selectively connect hardware components 146 to primary power bus 152. Thus, power from primary power bus 152 may be selectively delivered to hardware components 146.

The selection for power gate 142 may be controlled by controller 144 (e.g., as indicated by the dashed line extending from controller 144 and terminating in an arrow at power gate 142). For example, controller 144 may output a voltage (e.g., digital logic level or analog) that when received by power gate 142 configured power gate 142 to either connect or disconnect hardware components 146 with respect to primary power bus 152.

When removable device 140 is initially connected to host processor module 110, power gate 142 may, by default, disconnect hardware components 146 from primary power bus 152. Consequently, removable device 140 may not substantially draw power from host processor module 110 upon connection.

Low power bus 154 may connect to controller 144, and may supply controller 144 with a lower voltage level of power which controller 144 may use to operate. Consequently, when removable device 140 attaches to host processor module 110, controller 144 may initiate operation through consumption of power from low power bus 154 (e.g., auxiliary power from the power supply).

Controller 144 may also be connected to communication bus 150. Communication bus 150 may be a M-PESTI compliant bus that may allow controller 144 to communicate with a management controller, which manages power throughout data processing system 100.

In addition to communication bus 150, controller 144 may also be connected to various sideband communication links supported by connection 116. For example, as discussed above, the connectors used to implement connection 116 may include a number of pins usable for sideband communications.

To signal or otherwise indicate, to the management controller and host processor module 110, a type of removable device 140, controller 144 may send information to host processor module 110 via the sideband communication pins. Different types of removable devices 140 may send information to discriminate themselves from other types of devices.

A logic device of host processor module 110 may receive the signals/information and identify the type of removable device. However, not all removable devices 140 that attach to host processor module 110 may include functionality to cooperate with host processor module 110 and/or the management controller in managing consumption of power. Such devices may also not provide signals or information, as discussed above, to identify themselves. Consequently, if signals/information is not received by the logic device, then the logic device may infer that the device is unable to cooperate or is insensitive to power provided by data processing system 100.

Controller 144 may be implemented with a microcontroller or other type of programmable device. Controller 144 may include functionality (e.g., by being programmed to perform these functionalities) to (i) identify attachments to host processor modules, (ii) control power gate 142, (iii) communicate via communication bus 150, and (iv) use instructions provided by a management controller to cooperatively provide power to hardware components 146.

Figure 2B:
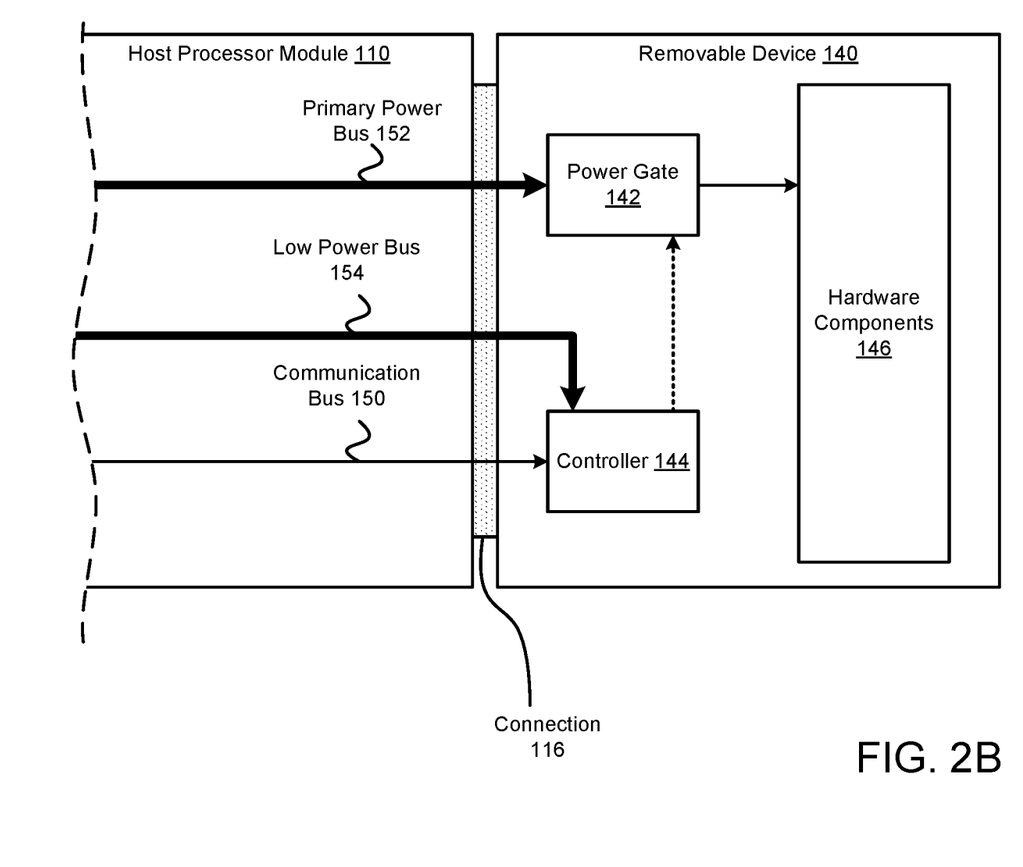
Figure 2C:
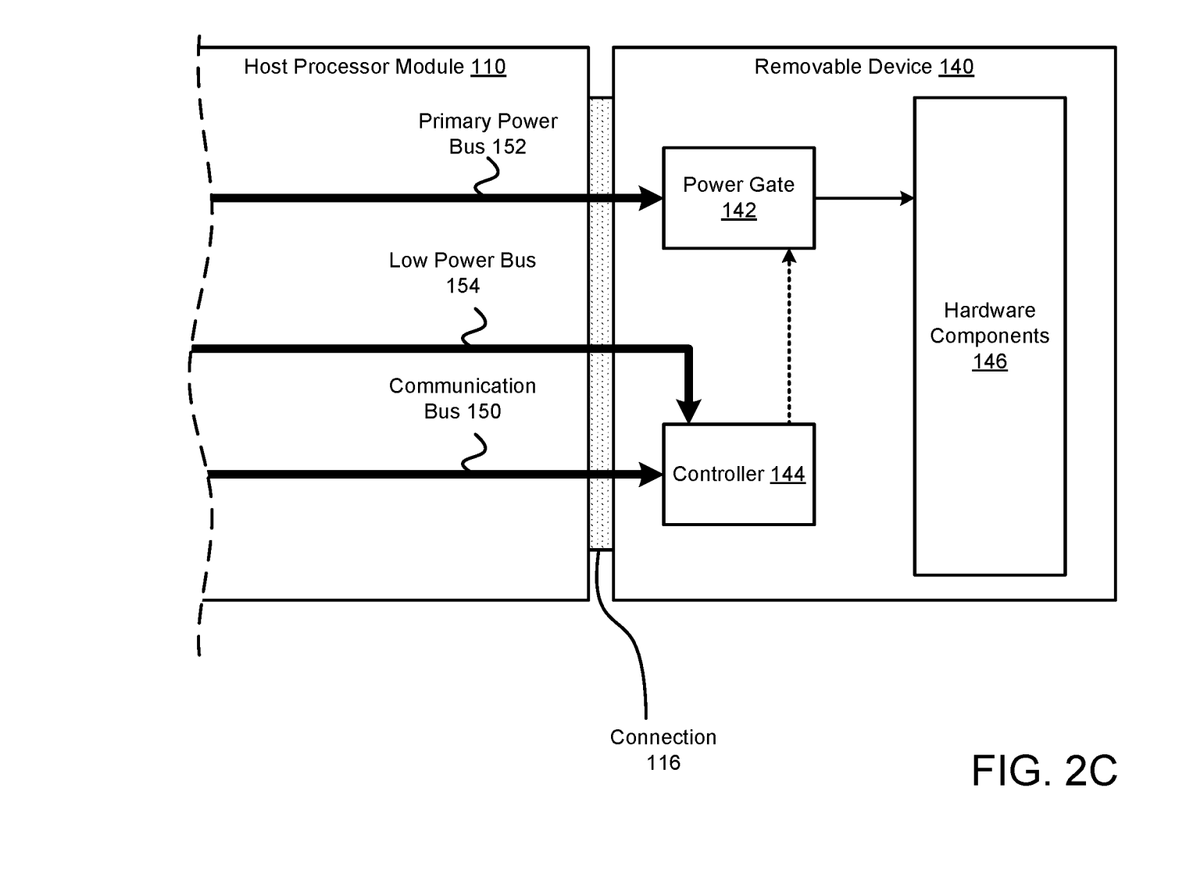
Figure 2D:
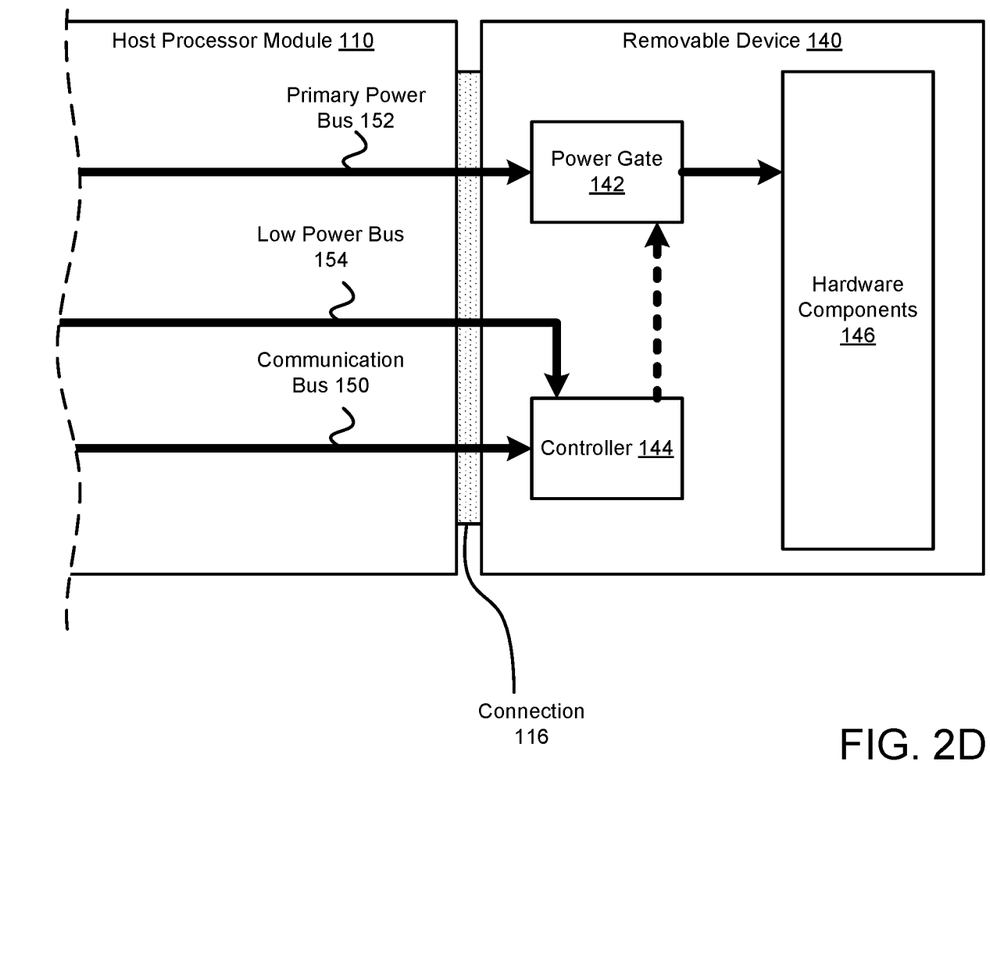

To further clarify connectivity topologies, connectivity topology diagrams with certain links highlighted using thicker line weights are shown in FIGS. 2B-2D.

Turning to FIG. 2B, a second connectivity diagram in accordance with an embodiment is shown. The connectivity shown in FIG. 2B may be present when removable device 140 is attached to host processor module. Thus, as seen, only the power distributions systems of host processor module 110 may be active in removable device 140. However, primary power bus 152 may be gated by power gate 142 from hardware components 146. Accordingly, only controller 144 may be active.

Turning to FIG. 2C, a third connectivity diagram in accordance with an embodiment is shown. The connectivity shown in FIG. 2C may be present after controller 144 negotiates a M-PESTI connection to a logic device of host processor module 110. To do so, controller 144 may make various assertions and de-assertions to the logic device via communication bus 150 to place the logic device into a discovery mode. The logic device may then discover controller 144 as a supported target for M-PESTI communications.

Once discovered and prepared for communication, controller 144 may wait for instructions from a management controller.

Turning to FIG. 2D, a fourth connectivity diagram in accordance with an embodiment is shown. The connectivity shown in FIG. 2D may be present after controller 144 receives instructions from a management controller. Once received controller 144 may configure power gate 142 to supply power to hardware components 146 as instructed by the management controller. The instructions may specify various aspect of ramping up the power consumption such as, for example, the rates at which power consumption may be increased over time. If followed, the instructions may improve the likelihood that removable device 140 and host processor module 110 not impacted by undesired power levels present on primary power bus 152.

Figure 2E:
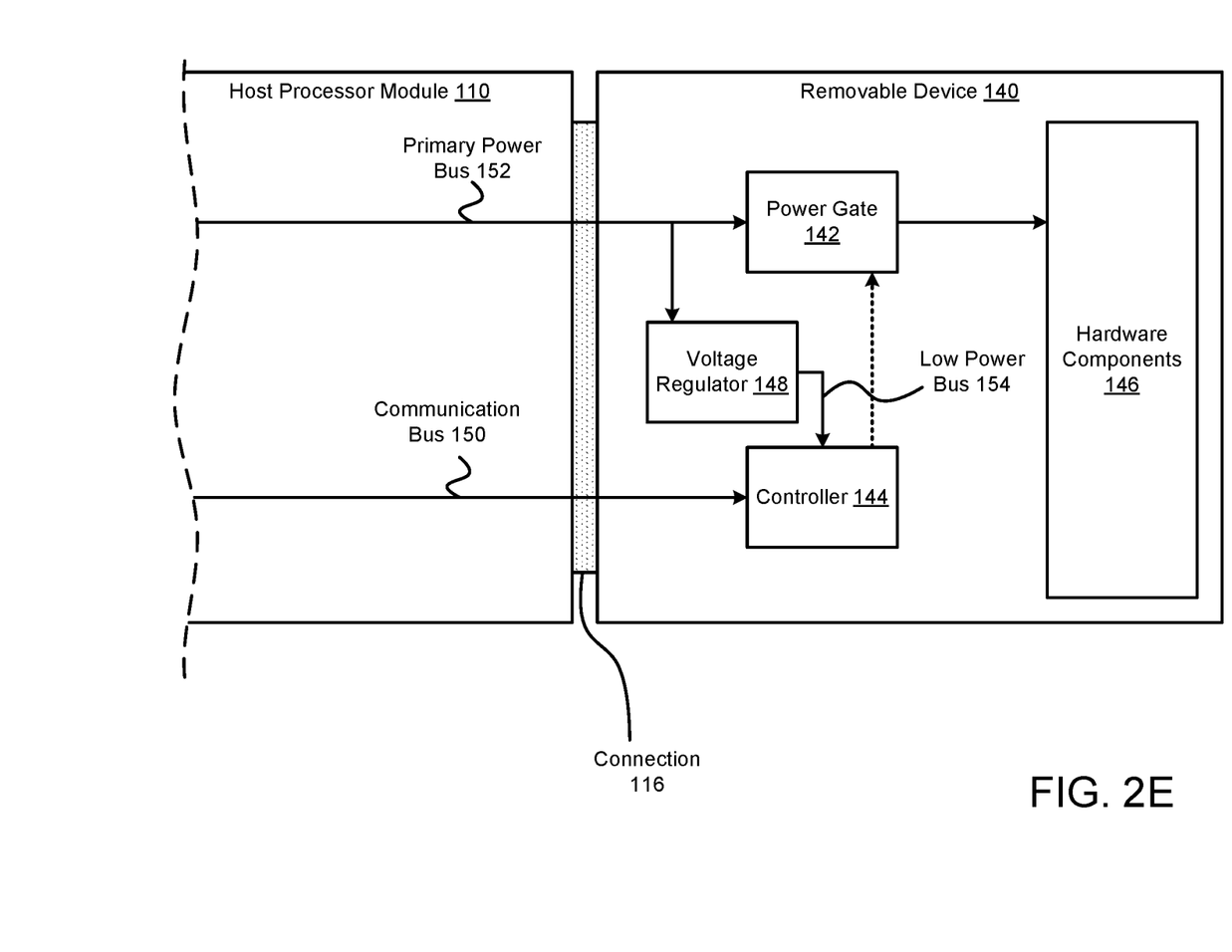

While shown in FIGS. 2A-2D as utilizing a low power bus, a removable device 140 may only utilize primary power bus 152 without departing from embodiments disclosed herein. For example, turning to FIG. 2E, a fifth connectivity diagram in accordance with an embodiment is shown. As seen in FIG. 2E, instead of relying on a low power bus from which to draw power at lower levels of voltage for controller 144, removable device 140 may include voltage regulator 148. Voltage regulator 148 may receive power from primary power bus 152 (e.g., at a higher voltage level), and output power with the lower level of voltage for use by controller 144.

As discussed above, the components of FIG. 1 may perform various methods to provide computer implemented services by managing power provided to removable devices. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing delivery of power to a removable device in accordance with an embodiment is shown. The method may be performed by data processing system 100, a management controller, controllers (e.g., 144), and/or other components of the system shown in FIG. 1.

At operation 300, an occurrence of an attachment of a device to a connector of a data processing system is identified. The occurrence may be identified by device starting to receive power from the data processing system.

At operation 302, primary power from the data processing system is gated off, and a discovery process for presence of a point to point communication link through the connector is performed. The primary power may be gated off through configuration of a power gate that separates the primary power from the hardware components of the device. The discovery process may be performed by performing various assertions and de-assertions (e.g., through sideband communications) that cause a logic device of the data processing system to initiate performance of the discovery. The discovery process may identify that the device is a M-PESTI target connected by a communication bus (i.e., a point-to-point communication link).

However, if the device does not support M-PESTI communications, then no discovery will occur, or the device may not even make the assertions to initiate the discovery process.

At operation 304, a determination is made regarding whether the point-to-point link is present. The determination may be made based on the outcome of the discovery process.

If the point-to-point link is present, then the method may proceed to operation 306. Otherwise the method may proceed to operation 310. If the method proceeds to operation 310, then the data processing system may presume that the device is insensitive to the power which will be delivered to it.

At operation 306, the primary power is continued to be gated off until an instruction is received via the point-to-point communication link. The instruction may be sent from a management controller, and may be customized based on the type of the device. The instructions may specify how the device is to begin to consume primary power until a nominal power consumption rate is reached.

The management controller may identify the type of the device based on advertisements by the device. For example, the device may send signals/data via certain sideband communication pins. The management controller may use a lookup table or other method to identify the type of the device based on the signals/data obtained from the device.

At operation 308, use of the primary power is initiated in response to receiving the instructions. Use of the primary power may be initiated by modify the operation of a power gate. For example, the power gate may be reconfigured to facilitate flow of the primary power to the hardware components of the device.

At operation 310, power management for the primary power is initiated. The power management may be initiated by monitoring characteristics of the primary power such as the voltage level, current level, droop, and/or other characteristics. Various actions (e.g., throttling, gentle power consumption reduction) may be performed responsively based on the monitored characteristics of the primary power. The responsively performed action may improve the likelihood that the consumed power meets expectations of the consumers (e.g., nominal voltage/current levels).

The method may end following operation 310.

Using the method illustrated in FIG. 3, a data processing system may supply power to a removable device in a manner that is less likely to caused undesired impacts. For example, by limiting initial use until a management controller is able to instruct the removable device on how to consume power to maintain the level of the power nominally, occurrences of undesired impacts due to non-ideal power may be avoided.

Figure 4:
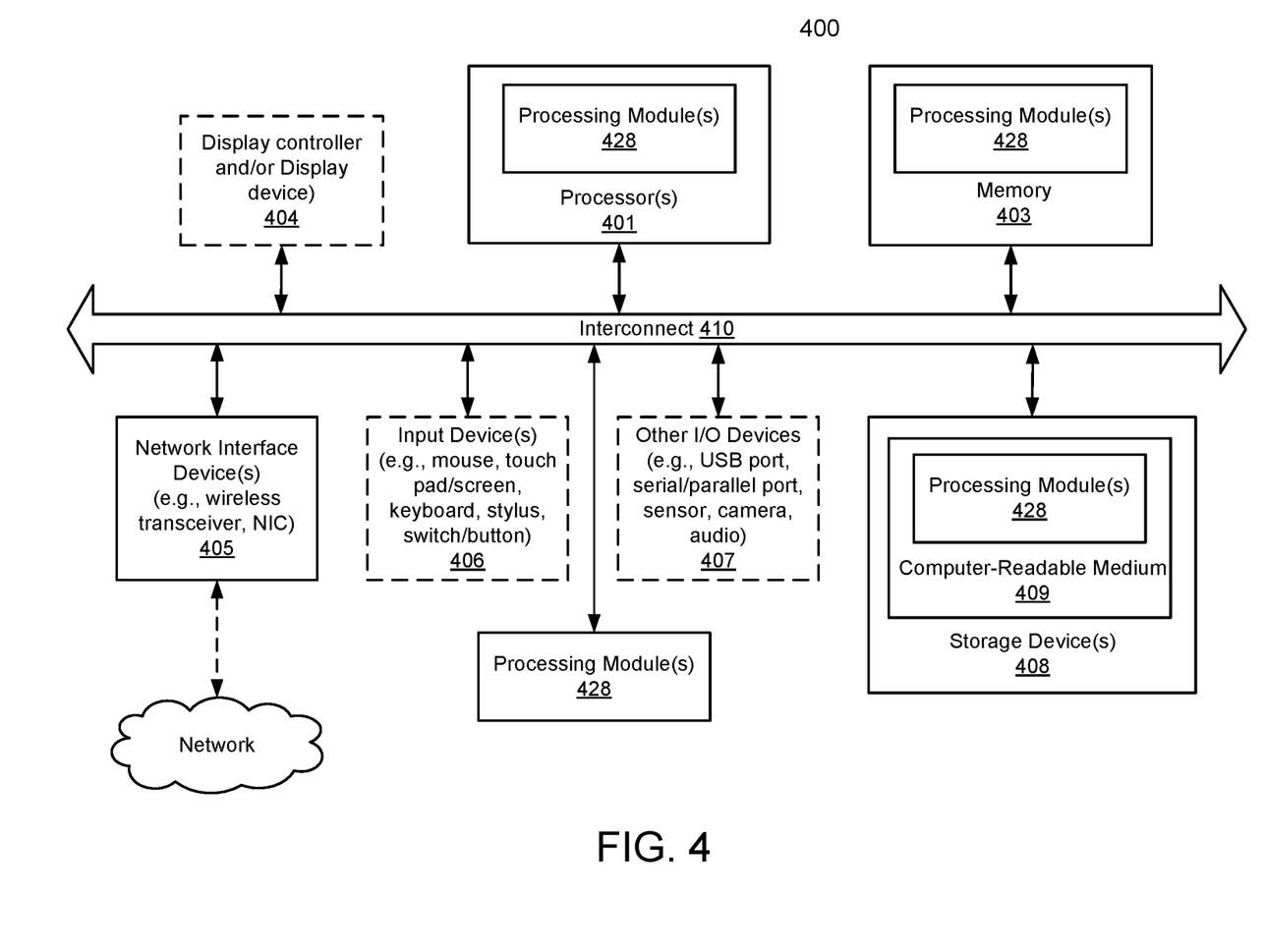
FIG. 4 shows a block diagram illustrating a data processing system in accordance with an embodiment.

Any of the components illustrated in FIGS. 1-2E may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In an embodiment, system 400 includes processor 401, memory 403, and devices 405-407 via a bus or an interconnect 410 (e.g., which may include M-PESTI and/or other types of communication links). Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:
    identifying an occurrence of an attachment of a device to a connector of the data processing system;
    in response to the occurrence:
        gating off primary power of the data processing system that is received via the connector;
        while the primary power is gated off, performing a discovery process for presence of a point-to-point communication link through the connector;
        in a first instance of the discovery process where the point-to-point communication link through the connector is present:
            continuing to gate off the primary power until an instruction is received via the point-to-point communication link;
            initiating use of the primary power by the device in response to receiving the instruction;
            initiating power management for the primary power while in use; and
            providing computer implemented services, in part, using the device while the primary power is in use by the device.

2. The method of claim 1, wherein performing the discovery process comprises:
    advertising, to the data processing system, a type of the device.

3. The method of claim 2, wherein the type of the device is advertised via an assertion and de-assertion using a sideband pin of the connector, and the type of the device indicates whether the device will gate off the primary power until instructed to utilize the primary power.

4. The method of claim 3, further comprising:
    in a second instance of the discovery process where the point-to-point communication link through the connector is not present:
        initiating use of the primary power by the device without waiting for the instruction;
        initiating power management for the primary power while in use; and
        providing computer implemented services, in part, using the device while the primary power is in use by the device.

5. The method of claim 4, wherein initiating the use of the primary power by the device in response to receiving the instruction comprises:
    performing a power management action to maintain a voltage level of the primary power as the use of the primary power is initiated by the device.

6. The method of claim 5, wherein initiating the power management comprises:
    monitoring the voltage level of the primary power from the data processing system.

7. The method of claim 6, wherein the instruction is generated by a management controller of the data processing system tasked with managing the voltage level of the primary power.

8. The method of claim 1, wherein primary power is gated off from hardware components of the device, the hardware components being used, in part, to provide the computer implemented services.

9. The method of claim 8, wherein, while the primary power is gated off, low power is consumed by a controller of the device to perform the discovery process.

10. The method of claim 9, wherein, the low power provided by the data processing system.

11. The method of claim 10, wherein, the low power is generated by the device using a voltage regulator and the primary power from the data processing system.

12. A non-transitory machine-readable medium having instructions stored therein, which when executed by a processor, cause the processor to perform operations for managing operation of a data processing system, the operations comprising:
    identifying an occurrence of an attachment of a device to a connector of the data processing system;
    in response to the occurrence:
        gating off primary power of the data processing system that is received via the connector;
        while the primary power is gated off, performing a discovery process for presence of a point-to-point communication link through the connector;
        in a first instance of the discovery process where the point-to-point communication link through the connector is present:
            continuing to gate off the primary power until an instruction is received via the point-to-point communication link;
            initiating use of the primary power by the device in response to receiving the instruction;
            initiating power management for the primary power while in use; and
            providing computer implemented services, in part, using the device while the primary power is in use by the device.

13. The non-transitory machine-readable medium of claim 12, wherein performing the discovery process comprises:
    advertising, to the data processing system, a type of the device.

14. The non-transitory machine-readable medium of claim 13, wherein the type of the device is advertised via an assertion and de-assertion using a sideband pin of the connector, and the type of the device indicates whether the device will gate off the primary power until instructed to utilize the primary power.

15. The non-transitory machine-readable medium of claim 14, further comprising:
    in a second instance of the discovery process where the point-to-point communication link through the connector is not present:
        initiating use of the primary power by the device without waiting for the instruction;
        initiating power management for the primary power while in use; and providing computer implemented services, in part, using the device while the primary power is in use by the device.

16. The non-transitory machine-readable medium of claim 15, wherein initiating the use of the primary power by the device in response to receiving the instruction comprises:
performing a power management action to maintain a voltage level of the primary power as the use of the primary power is initiated by the device.

17. The non-transitory machine-readable medium of claim 16, wherein initiating the power management comprises:
monitoring the voltage level of the primary power from the data processing system.

18. The non-transitory machine-readable medium of claim 17, wherein the instruction is generated by a management controller of the data processing system tasked with managing the voltage level of the primary power.

19. The non-transitory machine-readable medium of claim 12, wherein primary power is gated off from hardware components of the device, the hardware components being used, in part, to provide the computer implemented services.

20. A device, comprising:
hardware components; and
a controller programmed to perform operations, the operations comprising:
identifying an occurrence of an attachment of the device to a connector of a data processing system;
in response to the occurrence:
gating off primary power of the data processing system that is received by the device via the connector,
while the primary power is gated off, performing a discovery process for presence of a point-to-point communication link through the connector;
in a first instance of the discovery process where the point-to-point communication link through the connector is present:
continuing to gate off the primary power until an instruction is received via the point-to-point communication link;
initiating use of the primary power by the device in response to receiving the instruction;
initiating power management for the primary power while in use; and
contributing to computer implemented services provided by the data processing system using the hardware components while powered by the primary power.

* * * * *